United States Patent
Yang et al.

(10) Patent No.: US 7,446,831 B2
(45) Date of Patent: Nov. 4, 2008

(54) IN-PLANE FIELD TYPE REFLECTIVE LIQUID CRYSTAL DISPLAY DEVICE HAVING EXTRAORDINARY POLARIZERS

(75) Inventors: Chiu-Lien Yang, Miao-Li (TW); Chueh-Ju Chen, Miao-Li (TW); Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 665 days.

(21) Appl. No.: 11/066,971

(22) Filed: Feb. 25, 2005

(65) Prior Publication Data
US 2005/0190319 A1    Sep. 1, 2005

(30) Foreign Application Priority Data
Feb. 27, 2004    (TW) .................. 93105072 A

(51) Int. Cl.
*G02F 1/335* (2006.01)
(52) U.S. Cl. ..................... 349/96; 349/141
(58) Field of Classification Search ............... 349/96, 349/106, 113, 114, 141, 162, 123, 138; 359/490, 359/491, 492, 494, 497, 500; 428/1.31; 345/87, 88
See application file for complete search history.

(56) References Cited
U.S. PATENT DOCUMENTS

| | | | |
|---|---|---|---|
| 5,220,444 A | 6/1993 | Mitsui et al. | |
| 5,598,285 A | 1/1997 | Kondo et al. | |
| 5,684,551 A | 11/1997 | Nakamura et al. | |
| 5,691,791 A | 11/1997 | Nakamura et al. | |
| 5,737,046 A | 4/1998 | Moriwaki et al. | |
| 5,847,789 A | 12/1998 | Nakamura et al. | |
| 6,049,428 A * | 4/2000 | Khan et al. ................. | 359/491 |
| 6,097,458 A | 8/2000 | Tsuda et al. | |
| 6,195,140 B1 | 2/2001 | Kubo et al. | |
| 6,215,538 B1 | 4/2001 | Narutaki et al. | |
| 6,281,952 B1 | 8/2001 | Okamoto et al. | |
| 6,295,109 B1 | 9/2001 | Kubo et al. | |
| 6,330,047 B1 | 12/2001 | Kubo et al. | |
| 6,341,002 B1 | 1/2002 | Shimizu et al. | |
| 6,366,333 B1 | 4/2002 | Yamamoto et al. | |
| 6,433,847 B1 | 8/2002 | Minoura | |
| 6,452,654 B2 | 9/2002 | Kubo et al. | |
| 6,501,521 B2 | 12/2002 | Matsushita et al. | |
| 7,053,970 B2 * | 5/2006 | Lazarev ....................... | 349/96 |
| 2004/0105049 A1 * | 6/2004 | Yeh et al. ...................... | 349/96 |

(Continued)

*Primary Examiner*—Dung Nguyen
*Assistant Examiner*—Tai Duong
(74) *Attorney, Agent, or Firm*—Wei Te Chung

(57) ABSTRACT

A liquid crystal display device (100) includes an upper substrate (12), a lower substrate (11), and a liquid crystal layer (130) between the upper substrate and the lower substrate. The upper substrate includes an upper polarizer (143) and a color filter layer (127), the upper polarizer being an extraordinary type polarizer. The lower substrate includes a reflective film (119). A multiplicity of pixel electrodes (113) and common electrodes (111) are positioned at the lower substrate, for applying a voltage to the liquid crystal layer. The display device has a wide viewing angle, can work at high temperatures, and is relatively thin and compact. Further, the color filter layer is positioned above the upper polarizer. Optical beams reach the color filter layer after passing back through the liquid crystal layer and the upper polarizer. This reduces or eliminates color filter de-polarizing, and yields a high contrast ratio over wide viewing angles.

6 Claims, 2 Drawing Sheets

U.S. PATENT DOCUMENTS

2004/0146663 A1* 7/2004 Paukshto et al. ............ 428/1.31
2005/0140905 A1* 6/2005 Yang .......................... 349/141
2005/0157230 A1* 7/2005 Yang et al. .................. 349/114

* cited by examiner

IN-PLANE FIELD TYPE REFLECTIVE LIQUID CRYSTAL DISPLAY DEVICE HAVING EXTRAORDINARY POLARIZERS

BACKGROUND OF THE INVENTION

1. Cross Reference to Related Applications

This application is related to co-pending applications, two of which are entitled "In-plane field type transflective liquid crystal display device," and one of which is entitled "Transflective liquid crystal display device," and all of which are assigned to the same assignee as this application.

2. Field of the Invention

The present invention relates to liquid crystal displays (LCDs), and more particularly to an in-plane field type reflective liquid crystal display device having at least one extraordinary type polarizer.

3. Description of the Prior Art

Due to the features of being thin and consuming little power, liquid crystal display devices have been used in a broad range of fields. Applications include office automation (OA) apparatuses such as word processors and personal computers, portable information apparatuses such as portable electronic schedulers, videocassette recorders (VCRs) provided with information panels, and mobile phones provided with liquid crystal monitors.

Unlike with a cathode ray tube (CRT) display or an electroluminescence (EL) display, the liquid crystal display screen of a liquid crystal display device does not emit light itself. Instead, in a conventional transmission type liquid crystal display device, an illuminator called a backlight is provided at a rear or one side of the liquid crystal display device. The amount of light received from the backlight which passes through the liquid crystal panel is controlled by the liquid crystal panel, in order to provide images for display.

In the transmission type liquid crystal display device, the backlight consumes 50% or more of the total power consumed by the liquid crystal display device. That is, the backlight is a major contributor to power consumption.

In order to overcome the above problem, a reflection type liquid crystal display device ("RLCD") has been developed for portable information apparatuses which are often used outdoors or in places where artificial ambient light is available. The reflection type liquid crystal display device is provided with a reflector formed on one of a pair of substrates, instead of having a backlight. Ambient light is reflected from a surface of the reflector to illuminate the display screen. However, the RLCD still has an inherent drawback that cannot be eliminated; namely, a very narrow viewing angle. By adding one or more compensation films on the RLCD, this problem can be ameliorated to some extent. However, the extra components increase costs proportionately.

In addition, because a polarizer used in the RLCD is made of PVA, it cannot work at temperatures higher than 80 degrees Centigrade. This limits the kinds of application environments in which the RLCD can be used. Furthermore, because the polarizer is positioned as an outer surface of the RLCD, it is easily damaged or even destroyed in handling or in use. Moreover, in manufacturing of the RLCD, the polarizer is typically a separate part having protecting films. In the last step of manufacturing, the polarizer is adhered on the RLCD panel. This makes the RLCD unduly thick and bulky.

It is desired to provide an in-plane switching type reflective liquid crystal display device which overcomes the above-described deficiencies.

SUMMARY OF THE INVENTION

Accordingly, an object of the present invention is to provide a liquid crystal display device which has a wide viewing angle, which can work at high temperatures, and which is relatively thin and compact.

Another object of the present invention is to provide a liquid crystal display device which achieves a good contrast ratio over wide viewing angles.

To achieve the first above-mentioned object, a liquid crystal display device in accordance with the present invention comprises an upper substrate, a lower substrate, and a liquid crystal layer interposed between the upper substrate and the lower substrate. The upper substrate comprises an upper polarizer and a color filter layer, the upper polarizer being an extraordinary type polarizer. The lower substrate comprises a reflective film. A multiplicity of pixel electrodes and common electrodes are positioned at the lower substrate, for applying a voltage to the liquid crystal layer.

To achieve the second above-mentioned object, in three embodiments, the color filter layer is positioned above the upper polarizer. Optical beams reach the color filter layer after passing back through the liquid crystal layer and the upper polarizer. This arrangement reduces or eliminates the adverse effects of color filter de-polarizing, and yields a high contrast ratio over wide viewing angles.

Other objects, advantages and novel features of the present invention will be apparent from the following detailed description of exemplary embodiments thereof with reference to the attached drawings, in which:

DETAILED DESCRIPTION OF THE EXEMPLARY EMBODIMENTS

Figure 1:
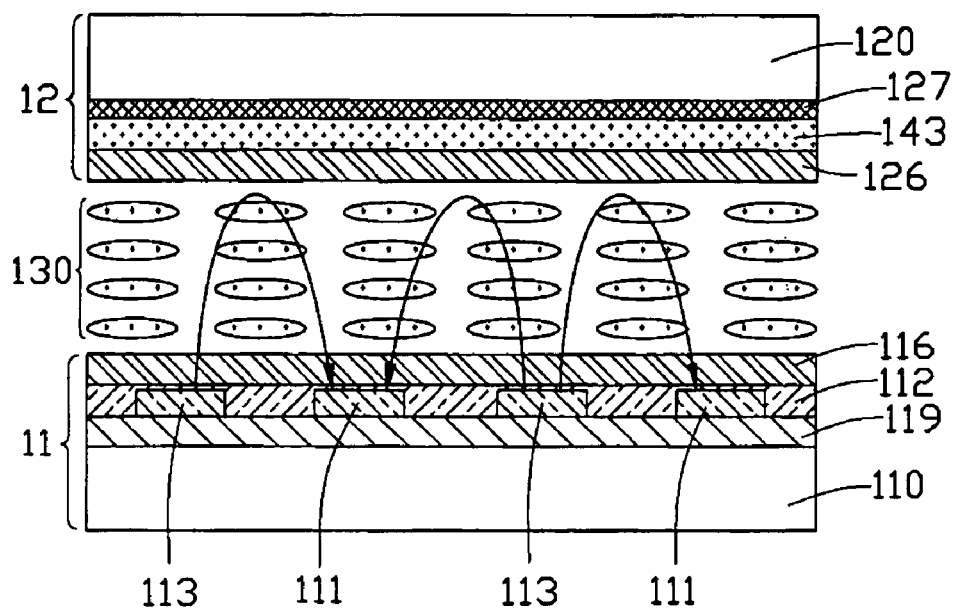
FIG. 1 is a schematic, side cross-sectional view of part of a liquid crystal display device according to a first embodiment of the present invention.

Referring to FIG. 1, a liquid crystal display device 100 of the first embodiment ("Example 1") according to the present invention includes an upper substrate 12, a lower substrate 1, and a liquid crystal layer 130 interposed between the upper substrate 12 and the lower substrate 11. The upper substrate 12 comprises a color filter layer 127, an upper polarizer 143 and an upper alignment film 126 positioned in that order from top to bottom on an inner surface of an upper glass plate 120. The lower substrate 11 comprises a reflective film 119, a multiplicity of pairs of a pixel electrode 113 and a common electrode 111, an insulating layer 112 and a lower alignment film 116 positioned in that order from bottom to top on an inner surface of a lower glass plate 110. In an alternative embodiment, the upper glass plate 120 and the lower glass plate 110 can be made of silicon dioxide ($SiO_2$) instead.

The pixel electrodes 113 and the common electrodes 111 are made of a transparent conductor. A material of the transparent conductor can, for example, be indium tin oxide (ITO)

or indium zinc oxide (IZO). The upper and lower alignment films 126, 116 are alignment layers for orientating liquid crystal molecules in the liquid crystal layer 130. The color filter layer 127 comprises a black matrix (not shown), and a color resin layer having Red, Green and Blue segments. The black matrix is disposed between segments of the color resin layer, to prevent light beams from leaking.

The upper polarizer 143 is an extraordinary type polarizer composed of mixtures of narrow-band components. Each narrow-band component comprises a modified organic dye material which exists in a liquid-crystalline phase. The polarizer 143 passes extraordinary polarized light beams, while blocking ordinary polarized light beams. The polarizer 143 is insulative, and a thickness thereof is less than 100 microns. This ensures that the operating voltage of the liquid crystal display device 100 is not affected by the polarizer 143 being formed at the inner surface of the upper substrate 12.

In operation, when no voltage is applied between the pixel and common electrodes 113 and 111, long axes of the liquid crystal molecules in the liquid crystal layer 130 maintain a predetermined angle relative to the upper alignment film 126 and the lower alignment film 116, and the liquid crystal molecules are stationed parallel to the upper and lower substrates 12 and 11.

When a voltage is applied (in the driven state), an electric field (not labeled) is generated between the pixel and common electrodes 113, 111. Because the pixel electrodes 113 and the common electrodes 111 are at the same substrate (and at the same layer, as seen in FIG. 1), the electric field is substantially parallel to the upper and lower substrates 12, 11. The substantially parallel electric field drives the liquid crystal molecules of the liquid crystal layer 130 to rotate so they have a new orientation that is still parallel to the upper and lower substrates 12 and 11. The change in orientation results in a change in light transmission, and the displayed image has the important advantage of a wide viewing angle.

The liquid crystal display device 100 of Example 1 has the polarizer 143 which is an extraordinary type polarizer positioned within the liquid crystal cell thereof, and the polarizer 143 has a thickness of less than 100 microns. Thus the liquid crystal display device 100 resists damage that might occur because of contamination or foreign matter, and is thin and compact. In addition, the liquid crystal display device 100 is ideal for use in a touch LCD panel, because only a touch layer needs to be positioned thereon. Furthermore, the polarizer 143 is made of a modified organic dye material which exists in a liquid-crystalline phase. Therefore the liquid crystal display device 100 can work at temperatures up to 200 degrees Centigrade, and has a broader range of applications in the LCD marketplace.

Moreover, the color filter layer 127 is positioned at the upper substrate 120 above the upper polarizer 143. Optical beams reach the color filter layer 127 after passing back through the liquid crystal layer 130 and the upper polarizer 143. This arrangement reduces or eliminates the adverse effects of color filter de-polarizing, and yields a high contrast ratio over wide viewing angles.

Figure 2:
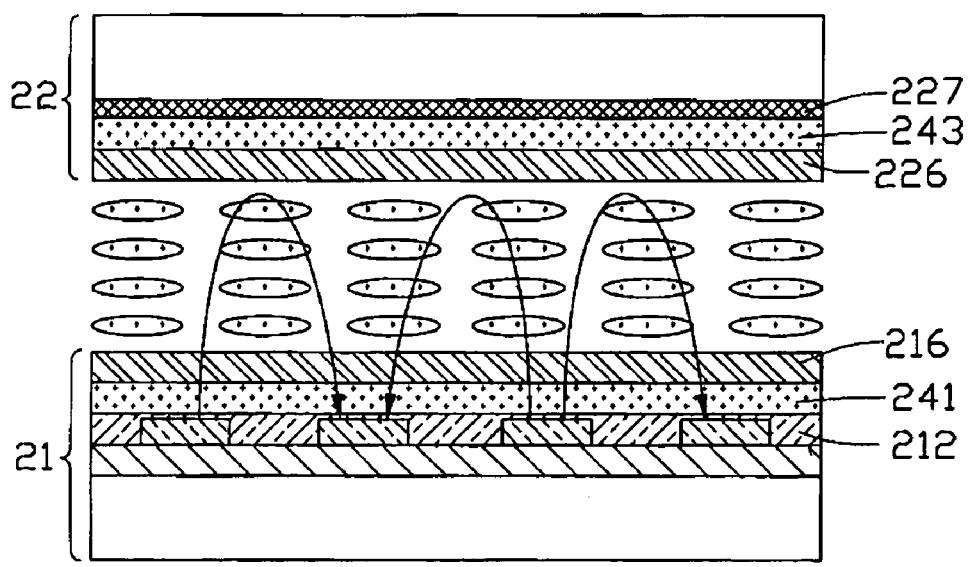
FIG. 2 is a schematic, side cross-sectional view of part of a liquid crystal display device according to a second embodiment of the present invention.

Referring to FIG. 2, a liquid crystal display device 200 of the second embodiment ("Example 2") according to the present invention has a structure similar to that of the liquid crystal display device 100 of Example 1. The liquid crystal display device 200 comprises an upper polarizer 243 positioned at an upper substrate 22, between a color filter layer 227 and an upper alignment film 226. Unlike in Example 1, the lower substrate 21 of the liquid crystal display device 200 further comprises a lower polarizer 241 positioned between an insulating layer 212 and a lower alignment film 216.

The upper and lower polarizers 243, 241 are both extraordinary type polarizers composed of mixtures of narrow-band components. Each narrow-band component comprises a modified organic dye material which exists in a liquid-crystalline phase. Polarizing axes of the polarizers 243, 241 are perpendicular to each other; that is, the polarizers 243, 241 are crossed polarizers. The polarizers 243, 241 pass extraordinary polarized light beams, while blocking ordinary polarized light beams. The polarizers 243, 241 are insulative, and each has a thickness of less than 100 microns. This ensures that the operating voltage of the liquid crystal display device 200 is not affected by the polarizers 243, 241 being formed at inner surfaces of the upper substrate 22 and the lower substrate 21 respectively.

Figure 3:
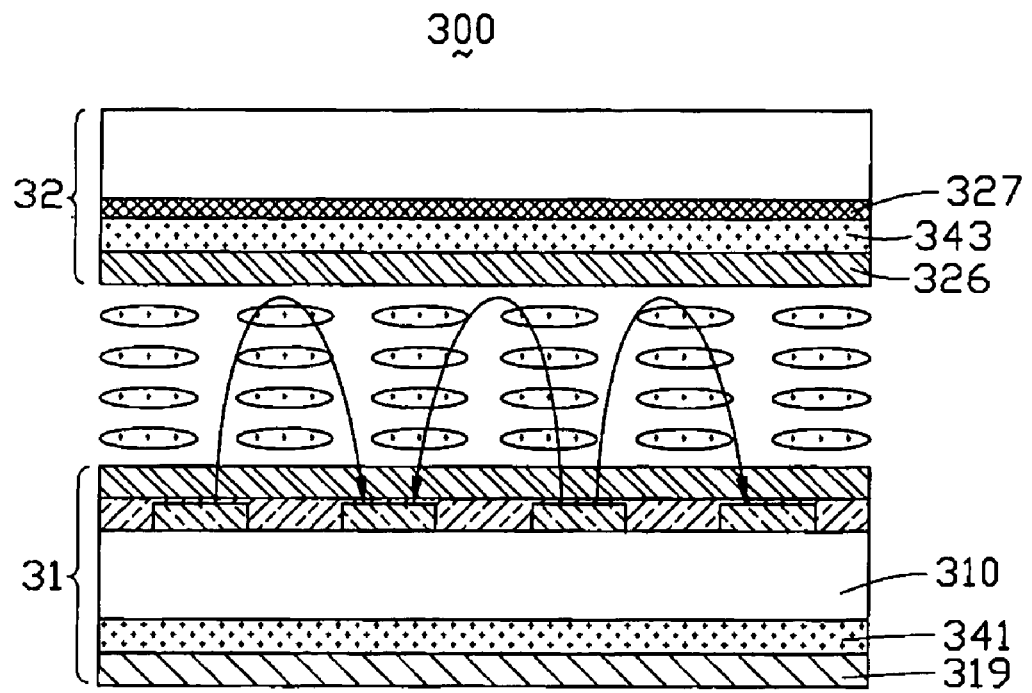
FIG. 3 is a schematic, side cross-sectional view of part of a liquid crystal display device according to a third embodiment of the present invention.

Referring to FIG. 3, a liquid crystal display device 300 of the third embodiment ("Example 3") according to the present invention has a structure similar to that of the liquid crystal display device 200 of Example 2. The liquid crystal display device 300 comprises an upper polarizer 343 positioned at an upper substrate 32, between a color filter layer 327 and an upper alignment film 326. Unlike in Example 2, a lower polarizer 341 and a reflective film 319 are positioned on an outer surface of a lower glass plate 310 of a lower substrate 31. That is, an outer surface of the reflective film 319 constitutes an outer surface of the lower substrate 31. Further, the lower polarizer 341 is an ordinary type polarizer.

Figure 4:
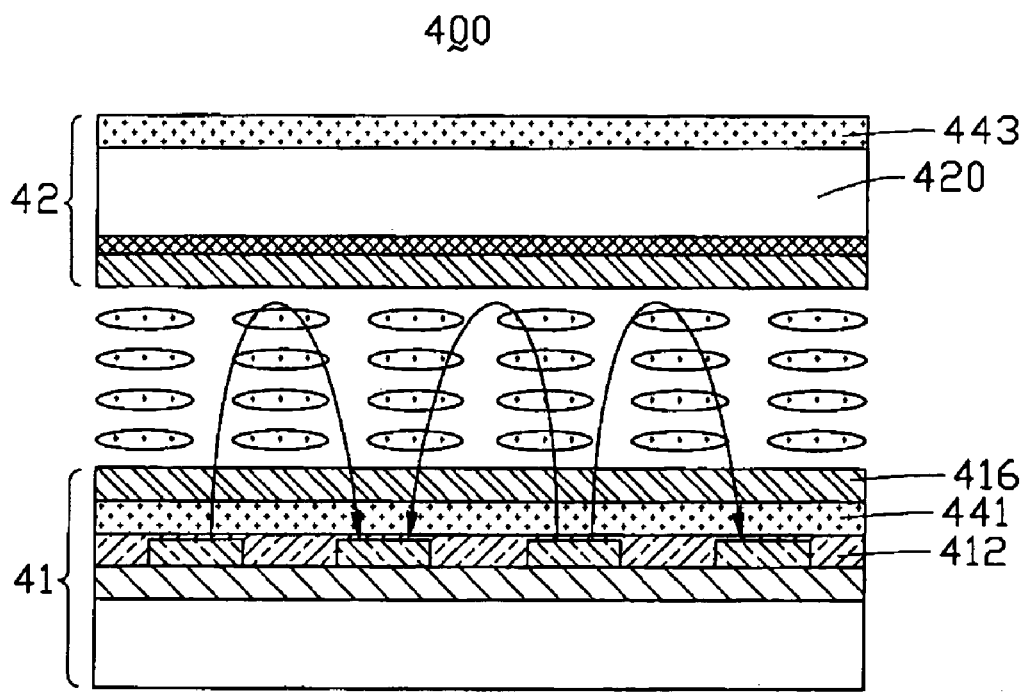
FIG. 4 is a schematic, side cross-sectional view of part of a liquid crystal display device according to a fourth embodiment of the present invention.

Referring to FIG. 4, a liquid crystal display device 400 of the fourth embodiment ("Example 4") according to the present invention has a structure similar to that of the liquid crystal display device 200 of Example 2. The liquid crystal display device 400 comprises a lower polarizer 441 positioned at a lower substrate 41, between an insulating layer 412 and a lower alignment film 416. Unlike in Example 2, an upper polarizer 443 at an upper substrate 42 is positioned on an outer surface of an upper glass plate 420. Further, the upper polarizer 443 is an ordinary type polarizer.

In each of Examples 3 and 4, polarizing axes of the pair of polarizers are perpendicular to each other; that is, the polarizers are crossed polarizers. One of the polarizers passes extraordinary polarized light beams, while blocking ordinary polarized light beams; and the other polarizer passes ordinary polarized light beams, while blocking extraordinary polarized light beams. This reduces leakage of light at wide viewing angles, thereby providing a better display image at wide viewing angles.

It is to be understood, however, that even though numerous characteristics and advantages of the present invention have been set out in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A liquid crystal display device comprising:
   an upper substrate comprising in turn a glass plate, a color filter, an upper polarizer and an alignment film, the upper polarizer being an extraordinary type polarizer;
   a lower substrate comprising in turn a glass plate, a reflective film, a plurality of pixel electrodes and common electrodes, an insulating layer, a lower extraordinary type polarizer, and an alignment film, the lower polarizer positioned at an inner surface of the lower substrate; and
   a liquid crystal layer interposed between the upper substrate and the lower substrate;

the plurality of pixel electrodes and common electrodes being for applying a voltage to the liquid crystal layer.

2. The liquid crystal display device as claimed in claim 1, wherein each of the polarizers has a thickness of less than 100 microns.

3. The liquid crystal display device as claimed in claim 1, wherein each of the polarizers is made of a modified organic dye material which exists in a liquid crystalline phase.

4. The liquid crystal display device as claimed in claim 1, wherein the pixel electrodes and the common electrodes are made of indium tin oxide and/or indium zinc oxide.

5. The liquid crystal display device as claimed in claim 1, wherein the pixel and common electrodes are positioned on a same layer at the lower substrate.

6. The liquid crystal display device as claimed in claim 1, wherein the pixel and common electrodes are positioned on different layers at the lower substrate.

* * * * *